United States Patent
Polack et al.

(10) Patent No.: US 9,240,269 B2
(45) Date of Patent: Jan. 19, 2016

(54) SOLENOID ACTUATOR, USE OF A SOLENOID ACTUATOR AND BRAKING OR CLAMPING DEVICE FOR LINEARLY MOVING AND/OR AXIALLY ROTATING COMPONENTS

(71) Applicant: BISCHOFF TECHNOLOGIE-MANAGEMENT GMBH, Stassfurt (DE)

(72) Inventors: Hans-Joachim Polack, Stassfurt-Ortsteil Neundorf (DE); Hartmut Bischoff, Stassfurt (DE)

(73) Assignee: BISCHOFF TECHNOLOGIE-MANAGEMENT GMBH, Stassfurt (DE)

( * ) Notice: Subject to any disclaimer, the term of this patent is extended or adjusted under 35 U.S.C. 154(b) by 0 days.

(21) Appl. No.: 14/344,959

(22) PCT Filed: Sep. 17, 2012

(86) PCT No.: PCT/DE2012/000917
§ 371 (c)(1),
(2) Date: Mar. 14, 2014

(87) PCT Pub. No.: WO2013/037354
PCT Pub. Date: Mar. 21, 2013

(65) Prior Publication Data
US 2015/0027819 A1    Jan. 29, 2015

(30) Foreign Application Priority Data
Sep. 17, 2011   (DE) .......................... 10 2011 113 411

(51) Int. Cl.
*F16D 63/00*       (2006.01)
*H01F 7/08*        (2006.01)
(Continued)

(52) U.S. Cl.
CPC ................ *H01F 7/081* (2013.01); *F16D 49/00* (2013.01); *F16D 63/008* (2013.01);
(Continued)

(58) Field of Classification Search
CPC ......... H01F 7/16; H01F 7/1638; H01F 7/081; F16D 63/008; F16D 49/00; F02M 51/061; F02M 51/0625
USPC .......... 188/65.1, 161, 163, 266, 267; 335/229
See application file for complete search history.

(56) References Cited

U.S. PATENT DOCUMENTS 3,556,266 A * 1/1971 McCarthy ..................... 188/171
4,272,747 A    6/1981 Bauer
(Continued)

FOREIGN PATENT DOCUMENTS

DE    74 06 334 U    11/1977
DE    28 43 593 A1    4/1980
(Continued)

OTHER PUBLICATIONS

International Search Report of PCT/DE2012/000917, mailed Feb. 13, 2013.
(Continued)

*Primary Examiner* — Vishal Sahni
(74) *Attorney, Agent, or Firm* — Collard & Roe, P.C.

(57) ABSTRACT

The invention relates to a solenoid actuator, consisting of a magnet body (1), a magnet armature, a cover (3) closing the space in which the magnet armature travels back and forth, at least one electric coil (4), which is arranged in the magnet body (1) concentrically around the axis of travel of the magnet armature, and means (5) for power transmission, which are in operative connection with the magnet armature and protrude out of the solenoid actuator. According to the invention, the magnet armature of the solenoid actuator is an axially guided annular magnet armature (2), and the means (5) for power transmission are arranged coaxially around the axis of travel of the annular magnet armature (2). This has the advantage that the solenoid actuator allows long switching paths and a small construction, along with high tightening and holding forces. This also results in the up to 100% higher holding force of the solenoid, making it particularly suitable for the actuation of braking and clamping equipment for rods and cables.

15 Claims, 3 Drawing Sheets

Figure 1:
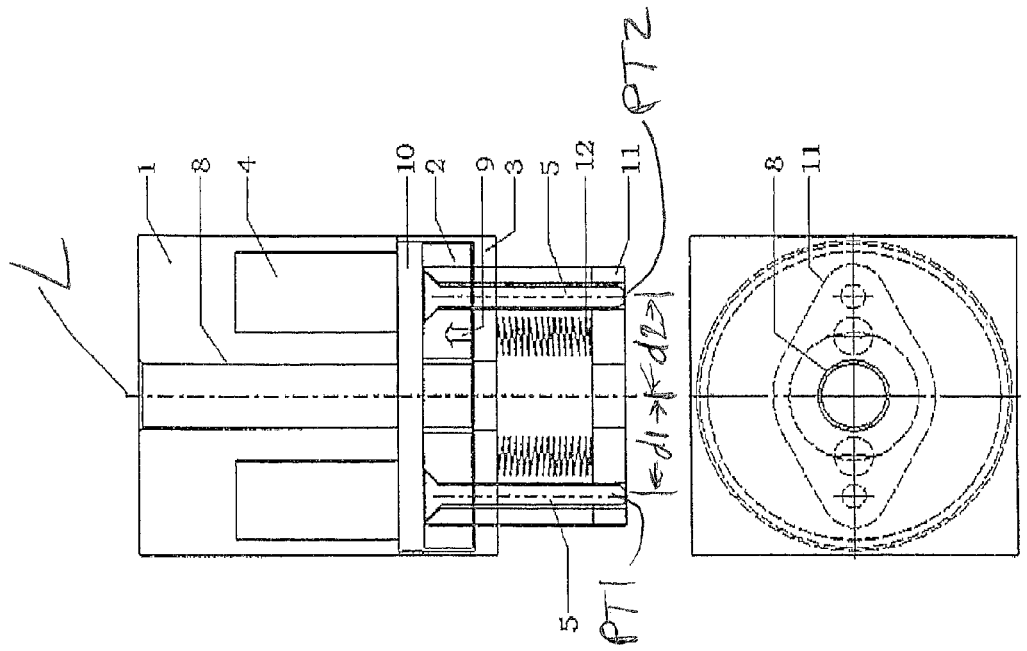

(51) Int. Cl.
*H01F 7/16* (2006.01)
*F16D 49/00* (2006.01)
*F16D 121/22* (2012.01)
*F16D 125/64* (2012.01)
*F16D 125/66* (2012.01)

(52) U.S. Cl.
CPC ......... *H01F 7/1638* (2013.01); *F16D 2121/22* (2013.01); *F16D 2125/64* (2013.01); *F16D 2125/66* (2013.01); *H01F 2007/086* (2013.01)

(56) References Cited

U.S. PATENT DOCUMENTS

| | | | |
|---|---|---|---|
| 4,763,091 | A | 8/1988 | Lang |
| 7,750,772 | B2 | 7/2010 | Hagen et al. |
| 8,436,704 | B1 * | 5/2013 | Venkataraghavan et al. . 335/281 |
| 2012/0153034 | A1 * | 6/2012 | Venkataraghavan et al. ..... 239/5 |
| 2012/0261499 | A1 * | 10/2012 | Dames ....................... 239/585.1 |

FOREIGN PATENT DOCUMENTS

| | | |
|---|---|---|
| DE | 35 05 377 A1 | 8/1986 |
| DE | 36 26 147 A1 | 2/1987 |
| DE | 195 37 656 A1 | 5/1996 |
| DE | 100 65 144 A1 | 7/2002 |
| DE | 10 2005 037193 A1 | 9/2006 |
| DE | 10 2005 026415 A1 | 12/2006 |
| EP | 0 326 966 A2 | 8/1989 |
| FR | 2 334 188 A1 | 7/1977 |
| WO | 02/071420 A1 | 9/2002 |

OTHER PUBLICATIONS

International Preliminary Report on Patentability and Written Opinion of PCT/DE2012/000917 mailed Mar. 27, 2014, in English.

* cited by examiner

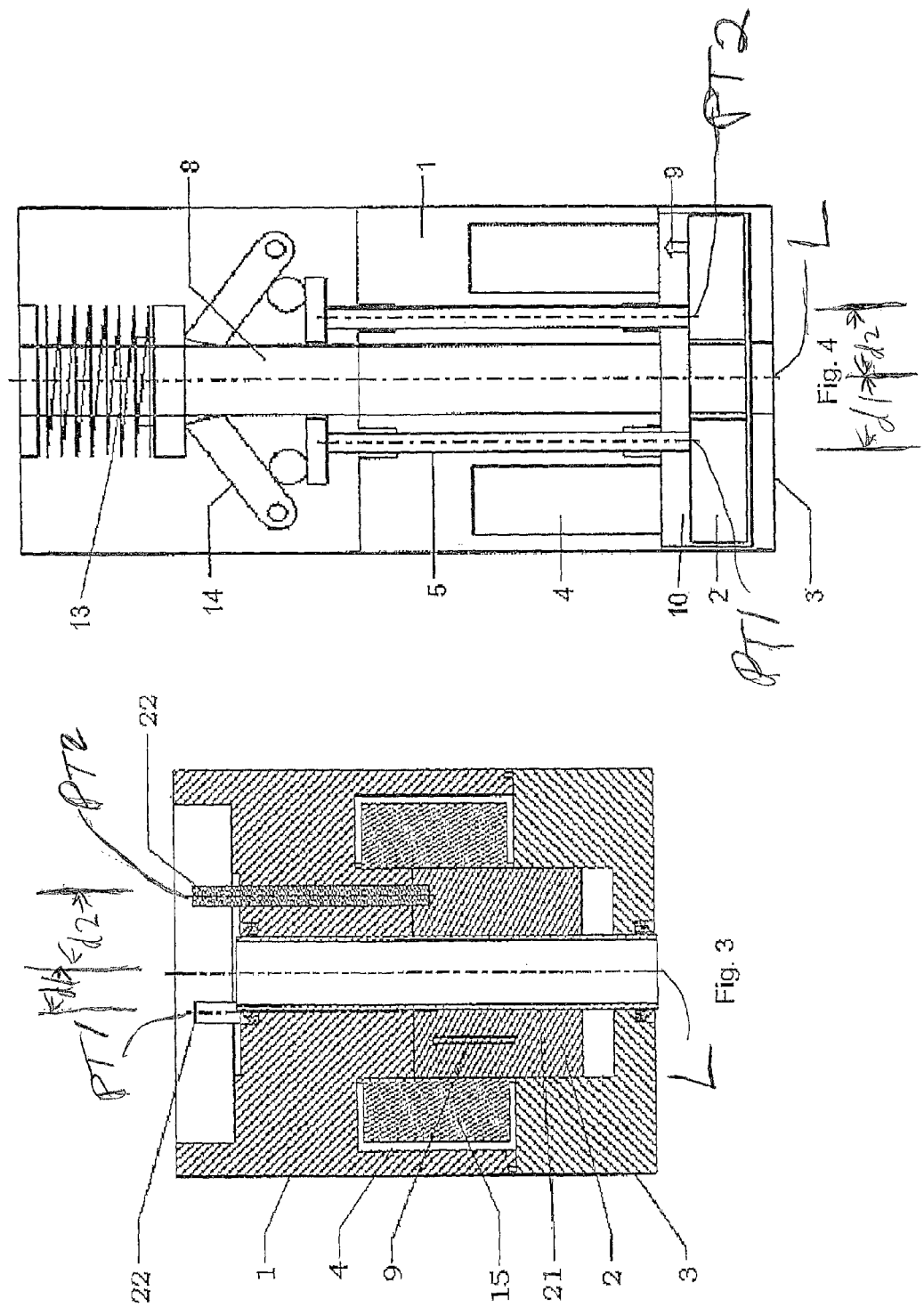

SOLENOID ACTUATOR, USE OF A SOLENOID ACTUATOR AND BRAKING OR CLAMPING DEVICE FOR LINEARLY MOVING AND/OR AXIALLY ROTATING COMPONENTS

CROSS REFERENCE TO RELATED APPLICATIONS

This application is the National Stage of PCT/DE2012/000917 filed on Sep. 17, 2012, which claims priority under 35 U.S.C. §119 of German Application No. 10 2011 113 411.9 filed on Sep. 17, 2011, the disclosure of which is incorporated by reference. The international application under PCT article 21(2) was not published in English.

STATE OF THE ART

The invention proceeds from a solenoid actuator according to the type of claim 1, the use of a solenoid actuator according to the type of claim 6, and a braking or clamping device for linearly moved and/or axially rotating components according to the type of claim 8.

Safety systems for braking and/or clamping linearly moved and/or axially rotating components, for example cables and rods, such as those offered for sale by the company Chr. Mayr GmbH & Co. KG, among others, are known. These safety brakes, offered for sale under the name ROBA-linear-stop, are driven hydraulically and pneumatically, as are all other clamping or braking systems offered for sale on the market worldwide. It is a disadvantage, in this connection, that the media required for this purpose generally have to be made available first, while electrical energy is generally present at the locations of use of the clamping and braking system and is furthermore cheaper than hydraulically or pneumatically produced pressure energy. Those costs that are caused by the absolutely tight design of the systems on site, to guarantee the safety requirements established for such safety brakes, are added to the high provisioning costs. Furthermore, the high maintenance expenditure, which hydraulic systems, in particular, require because of the regular oil changes that must be performed, is disadvantageous. During maintenance times of the braking system, the entire facility into which the maintenance system is integrated is shut down.

These disadvantages can be overcome by braking and clamping systems that have an electrically operated solenoid actuator as the setting element. Very high holding forces can be generated using magnetic clamps. It is disadvantageous, in this connection, that the armatures of the magnetic clamps are not able to overcome larger air gaps. In general, the maximal air gap amounts to approximately 1 mm. As a result, no greater setting paths can be traveled or bridged, either.

Relatively great air gaps can be overcome using lifting magnets. In the case of conventional lifting magnets or pulling magnets, a lifting armature is situated in their axial center, which is guided by an armature spindle (DE 74 06 334 U; DE 28 43 593; DE 195 37 656 A1). However, in order to implement greater forces, the construction of the magnet must also be designed to be correspondingly large. This in turn has the disadvantage that they require a large construction space, which is not available in the case of braking or clamping devices for linearly moved and/or axially rotating components or mechanical processes, for example

The Invention and its Advantages

In contrast, the solenoid actuator according to the invention, having the characterizing feature of claim 1, has the advantage that it allows long switching paths and a small construction at high attraction and holding forces. In this way, it is particularly suitable for activation of braking and clamping technology of rods and cables.

This is achieved in that the magnet armature is an axially guided ring magnet armature and the means for power transmission are disposed coaxially around the lifting axis of the ring magnet armature. Its up to 100% higher holding force also results from this. The term ring magnet armature should be understood not just as a magnet armature that is in the shape of a circular ring in a top view. Instead, here the syllable "ring" refers to any possible close shape of a polygon.

According to an advantageous embodiment of the invention, the magnet armature is configured as a flat armature, with a significantly greater width, in comparison with its height, of its ring-shaped holding and adhesion surface. The flatter configuration of the armature permits an overall flatter construction of the solenoid actuator. By means of the combination of two magnet systems, a completely new magnet form has been created, which meets higher demands and can be universally used.

The high attraction and holding forces of the flat armature magnet are based on a precisely determined magnetic flow calculation and control electronics newly developed for this magnet design, which make it possible to generate more than one hundred times super-excitation in the magnet within a millisecond range, and thereby also to implement super-proportionally high attraction forces.

Furthermore, it has been shown that the new magnet form can also be used in all other application cases, in other words anywhere where high attraction and holding forces are required.

The braking or clamping device according to the invention, for linearly moved and/or axially rotating components, having the characteristics of claim 8, has the advantage, as compared with hydraulically or pneumatically driven braking systems, that it works faster and with greater energy savings, and is practically maintenance-free. Furthermore, because of the lower equipment technology expenditure, it is more cost-advantageous not only for making the energy source available but also for the solenoid actuator, in terms of its production. This is achieved by means of the use of a solenoid actuator as a setting drive for the breaking system, the magnet armature of which is an axially guided ring magnet armature and in which the means for power transmission are disposed coaxially around the lifting axis of the ring magnet armature. In this connection, the solenoid actuator can not only trigger the braking or clamping process, but also lift a brake that is in effect. In the latter case, the solenoid actuator acts as a lifting device for current-free braking and/or clamping of rods, shafts or cables, with similarly good parameters as allowed by a hydraulic or pneumatic lifting device.

Further advantages and advantageous embodiments of the invention can be derived from the following description of the drawing and the claims.

DRAWING

Figure 2:
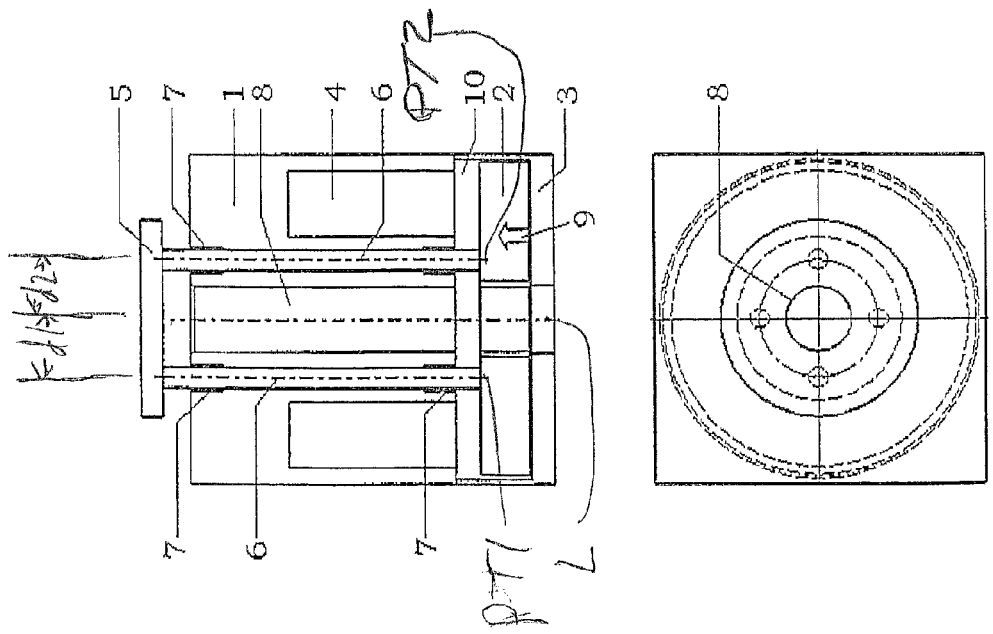
Figure 5:
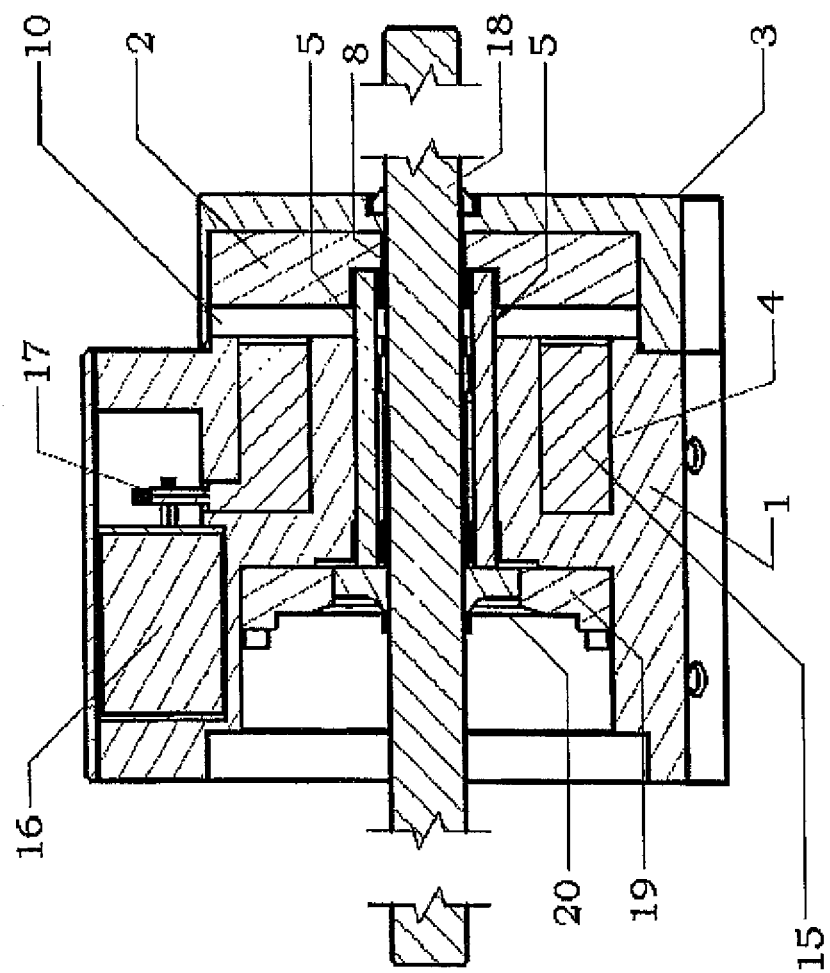

Exemplary embodiments of the object of the invention are shown in the drawing and will be explained in greater detail below. The drawing shows:

FIG. 1 the basic structure of a solenoid actuator according to the invention, FIG. 2 a second use of the solenoid actuator, FIG. 3 a third use of the solenoid actuator, FIG. 4 a solenoid actuator having a braking device, and FIG. 5 the arrangement of a braking system within a solenoid actuator.

DESCRIPTION OF THE EXEMPLARY EMBODIMENT

FIG. 1 shows a solenoid actuator according to the invention, consisting of a magnet body 1, which forms the magnet housing. In its lower region, there is a ring magnet armature 2. Magnet body 1 and ring magnet armature 2 are closed off by a magnet cover 3. In the magnet body 1, a coil space 4 for accommodating electrical coils is provided concentrically around the lifting axis of the ring magnet armature 2, shown as a dot-dash line. For power transmission to a setting means 5, four dead-end bores are introduced into the ring magnet armature 2, coaxial to its lifting axis (see top view), into each of which bores a pressure bolt 6 is loosely inserted. At their free end, in each instance, projecting out of the magnet body 1, the pressure bolts 6 are connected with the setting means 5, which is a pressure plate in the present example. In the region of the entry into and exit out of the magnet body 1, in each instance, the pressure bolts 6 are guided in accommodations 7 in the magnet body 1. As a result, and because of the mechanically uncoupled attachment of the guide bolts 6 in the ring magnet armature 2, the armature, precisely linearly guided by the pressure bolts 6, can always perform its work parallel to the armature counter-surface.

The basic structure of the solenoid actuator shown in FIGS. 1 and 2 is that of a pot magnet as a lifting or pulling magnet having an axial passage bore 8 that is situated not only in the ring magnet armature 2 but also in the magnet lid 3. The working stroke path of the ring magnet armature 2 is indicated with an arrow 9. The air gap between the magnet body 1 and the ring magnet armature 2 was indicated with the reference number 10. Either a rod, shaft or a cable can be passed through the aforementioned passage bores 8. The working surfaces of the ring magnet armature 2 and of the armature counter-piece in the magnet body 1 are protected from outside influences by means of seals. In this connection, the shape of the magnet body 1 can be of different geometrical shapes. Such a solenoid actuator can be used for various switching functions that require high pushing and/or holding forces.

The second embodiment shown in FIG. 2 shows a solenoid actuator also having a passage bore 8 that passes through it, in which two pressure pins are passed through the ring magnet armature 2 and the magnet cover 3 as setting means 5, and connected with one another by way of a flange plate 11. Spring packages 12 are disposed between the flange plate 11 and the magnet cover 3, which packages activate an activation mechanism, not shown here, for example a braking mechanism for rods, shafts or cables.

FIG. 3 shows a third embodiment of the solenoid actuator according to the invention in a sectional representation, the ring magnet armature 2 of which has a cylindrical elongated shape having a center bore. The magnet cover 3 is attached at the lower end of the solenoid actuator, by means of screws, on its housing. The components that correspond to the parts mentioned in the description of FIGS. 1 and 2 were provided with the same reference numbers. A bearing sleeve 21, which protects the magnet from dirt and moisture, for one thing, and for another thing serves as a guide for the freely movable ring magnet armature 2 which has a slide bearing bushing in its center bore for this purpose, leads through the entire solenoid actuator. In the upper region of the magnet body 1, bores are introduced coaxially to the lifting axis of the ring magnet armature 2, which bores accommodate pressure pins 22 that sit loosely in dead-end bores of the ring magnet armature 2 with their one end, and act on a pressure spring, not shown here, with their free end that projects out of the magnet body 1, which spring acts as a recovery spring for the ring magnet armature 2.

FIG. 4 shows a section through a braking device provided with a solenoid actuator according to the invention, which can be structured, for example, as a rod clamping device or brake or as a cable brake. The components that correspond to the parts mentioned in the description of FIGS. 1 to 3 were provided with the same reference numbers.

In such use, it is required that the part (rod, shaft or cable) to be braked or to be clamped is guided through the brake element. The braking force itself is generated, in this embodiment, by a pressure spring 13. The solenoid actuator according to the invention is available as a lifting device for the pressure spring 13, with its components described in FIGS. 1 and 2. So that the solenoid actuator can allow the force to act centrally on the pressure spring 13, it is required that the rod, shaft or cable is also guided through the solenoid actuator. In order to be able to brake or clamp a rod, shaft or cable having a relatively small diameter, very great clamping forces by a clamping element 14 are required. The clamping element 14 is activated either by a lever system, not shown in any detail here, or by a wedge gear. In order for great forces to be able to become active here, their setting drive must also be able to travel a long path. Working strokes of 6 to 10 mm are possible with the solenoid actuator according to the invention.

Finally, in FIG. 5, a section through a braking system provided with a solenoid actuator according to the invention is shown, the activation means of which system are situated within the solenoid actuator. The components that correspond to the parts mentioned in the description of FIGS. 1 and 2 were provided with the same reference numbers. In addition to the components already mentioned, this representation shows the placement of a ring coil 15 in the coil space 4 of the solenoid actuator. The switching electronics 16 with the electrical connector 17 are also accommodated within the magnet body 1. A rod 18 is passed through the solenoid actuator within the passage bore 8. The setting means 5 connected with the magnet armature 2 are articulated onto a pressure plate 19 with their other end, which plate in turn stands in an operative connection with a clamping part 20 disposed coaxially around the rod 18.

FIGS. 1 to 4 show lifting axis L of the magnet armature 2 and show power transmission axes PT1 and PT2 of the means for power transmission. Axis L, axis PT1 and axis PT2 are different from each other and are separate from each other. Axis PT1 is spaced from axis L by distance d1. Axis PT2 is spaced from axis L by distance d2. Distance d1 is shown to be the same as distance d2 in FIGS. 1, 2 and 4.

Distance d1 is shown to be different from distance d2 in FIG. 3. Both d1 and d2 are positive numbers greater than zero. Hence the means for power transmission are disposed concentrically around the lifting axis of the ring magnet armature.

All of the characteristics mentioned in the description, the following claims, and shown in the drawing can be essential to the invention both individually and in any desired combination with one another.

REFERENCE NUMBER LIST 1 magnet body
2 ring magnet armature
3 magnet cover
4 coil chamber
5 setting means 6 pressure bolt
7 accommodations
8 passage bore
9 work stroke path
10 air gap
11 flange plate
12 spring package
13 pressure spring
14 clamping element
15 ring coil
16 switching electronics
17 electrical connector
18 rod
19 pressure plate
20 clamping part
21 bearing sleeve
22 pressure pins

The invention claimed is:

1. Solenoid actuator comprising a magnet body (1), a magnet armature, a cover (3) that closes off a lifting space of the magnet armature, at least one electrical coil (4) that is disposed in the magnet body (1), concentrically around a lifting axis (L) of the magnet armature, and means (5) for power transmission, which stand in an operative connection with the magnet armature and project out of the solenoid actuator,
wherein said means (5) has power transmission axes (PT1) and (PT2);
wherein the magnet armature of the solenoid actuator is an axially guided ring magnet armature (2), and the means (5) for power transmission are disposed concentrically around the lifting axis (L) of the ring magnet armature (2); and
wherein (L), (PT1) and (PT2) are different from each other and are separate from each other.

2. Solenoid actuator according to claim 1,
wherein
the ring magnet armature (2) is configured as a flat armature having a significantly greater width, in comparison with its height, of its ring-shaped holding and adhesion surface.

3. Solenoid actuator according to claim 1,
wherein
the magnet body (1), the ring magnet armature (2), and the magnet cover (3) have a central passage opening (8), the axis of which corresponds to the lifting axis.

4. Solenoid actuator according to claim 1,
wherein
the means (5) for power transmission stand in an operative connection with a braking or clamping device for linearly moving and/or axially rotating components with their free end.

5. Solenoid actuator according to claim 4,
wherein
the magnet body (1), the ring magnet armature (2), and a magnet lid (3) have a central passage opening (8), the axis of which corresponds to the lifting axis, and wherein the linearly moved and/or axially rotating components project at least in part into this passage opening (8).

6. Solenoid actuator according to claim 1, wherein
means (5) for power transmission is setting means (5) which is a pressure plate.

7. Solenoid actuator according to claim 1,
wherein means for power transmission comprises pressure bolts, or pressure pins.

8. A solenoid actuator, comprising a magnet body (1), a magnet armature, a cover (3) that closes off a lifting space of the magnet armature, electrical coils (4) that are disposed in the magnet body (1), concentrically around a lifting axis (L) of the magnet armature, and means (5) for power transmission, which stand in an operative connection with the magnet armature and project out of the solenoid actuator,
wherein said means (5) has power transmission axes (PT1) and (PT2);
wherein the magnet armature of the solenoid actuator is an axially guided ring magnet armature (2), the means (5) for power transmission of the solenoid actuator are disposed concentrically around the lifting axis (L) of the ring magnet armature (2), and such a solenoid actuator is used for activation of a braking or clamping device for linearly moving and/or axially rotating components, which device has activation means disposed around the axis of the linearly moving and/or axially rotating components, which means stand in an operative connection with the means (5) for power transmission of the solenoid actuator; and
wherein (L), (PT1) and (PT2) are different from each other and are separate from each other.

9. The solenoid actuator according to claim 8,
wherein
the ring magnet armature (2) of the solenoid actuator is configured as a flat armature having a significantly greater width, in comparison with its height, of its ring-shaped holding and adhesion surface.

10. Solenoid actuator according to claim 8,
wherein
means (5) for power transmission is setting means (5) which is a pressure plate.

11. Solenoid actuator according to claim 8, wherein
means for power transmission comprises pressure bolts, or pressure pins.

12. Braking or clamping device for linearly moving and/or axially rotating components, for example cables, rods, shafts, and the like, comprising braking or clamping jaws that concentrically surround the components, setting elements activating these jaws, and a setting drive,
wherein
the setting drive comprises a solenoid actuator, a magnet armature of which is an axially guided ring magnet armature (2) and which has setting means (5) disposed concentrically around a lifting axis (L), which means project out of the solenoid actuator and stand in an operative connection with the setting elements of the braking or clamping jaws,
wherein said setting means (5) has power transmission axes (PT1) and (PT2), and wherein (L), (PT1) and (PT2) are different from each other and are separate from each other.

13. Braking or clamping device according to claim 12,
wherein
the ring magnet armature (2) is configured as a flat armature having a significantly greater width, in comparison with its height, of its ring-shaped holding and adhesion surface.

14. Braking or clamping device according to claim 12,
wherein
the solenoid actuator coaxially encloses the linearly moving and/or axially rotating components.

15. Braking or clamping device according to claim 12, wherein
setting means (5) is a pressure plate.

* * * * *